US009439206B2

(12) United States Patent
Hofmann et al.

(10) Patent No.: US 9,439,206 B2
(45) Date of Patent: Sep. 6, 2016

(54) METHOD FOR CONTROLLING MEASUREMENTS IN A WIRELESS TELECOMMUNICATIONS TERMINAL

(75) Inventors: Matthias Hofmann, Freital (DE); Thomas Konrad, Dresden (DE)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 13/158,770

(22) Filed: Jun. 13, 2011

(65) Prior Publication Data

US 2011/0305159 A1   Dec. 15, 2011

(30) Foreign Application Priority Data

Jun. 11, 2010 (EP) .................................. 10165671

(51) Int. Cl.
| | |
|---|---|
| *H04J 1/16* | (2006.01) |
| *H04W 72/08* | (2009.01) |
| *H04L 12/26* | (2006.01) |
| *H04W 52/02* | (2009.01) |
| *H04W 24/10* | (2009.01) |
| *H04W 72/04* | (2009.01) |

(52) U.S. Cl.
CPC ....... *H04W 72/085* (2013.01); *H04W 52/0225* (2013.01); *H04L 43/02* (2013.01); *H04L 43/022* (2013.01); *H04L 43/024* (2013.01); *H04L 43/04* (2013.01); *H04L 43/06* (2013.01); *H04L 43/067* (2013.01); *H04L 43/0811* (2013.01); *H04L 43/0817* (2013.01); *H04W 24/10* (2013.01); *H04W 52/02* (2013.01); *H04W 52/028* (2013.01); *H04W 52/0209* (2013.01); *H04W 52/0222* (2013.01); *H04W 52/0229* (2013.01);

(Continued)

(58) Field of Classification Search
CPC ... H04L 43/02; H04L 43/022; H04L 43/024; H04L 43/04; H04L 43/06; H04L 43/067; H04L 43/0811; H04L 43/0817; H04W 24/10; H04W 52/0261; H04W 52/0264; H04W 52/0274; H04W 52/028; H04W 52/02; H04W 52/0209; H04W 52/0222; H04W 52/0225; H04W 52/0229; H04W 52/0232; H04W 52/0241; H04W 52/0245; H04W 72/085; H04W 72/0406; Y02B 60/50
USPC ........................................ 370/252, 254, 469
See application file for complete search history.

(56) References Cited

U.S. PATENT DOCUMENTS

| | | | |
|---|---|---|---|
| 8,320,918 B2 * | 11/2012 | Lee et al. ....................... | 455/441 |
| 2007/0072611 A1 * | 3/2007 | Feder et al. ................... | 455/436 |

(Continued)

OTHER PUBLICATIONS

3GPP TS 36.331 v8.5.0 (Mar. 2009), 3rd Generation Partnership Project, Technical Specification Group Radio Access Network, EUTRA RRC, Protocol Specification Rel 8, 2009.*
"3GPP TS 36.331", v8.5.0 (Mar. 2009), 3GPP, Technical Specification Group Radio Access Network; E-UTRA RRC; Protocol Specification (Release 8).*

(Continued)

*Primary Examiner* — Peter Cheng
(74) *Attorney, Agent, or Firm* — Schwegman Lundberg & Woessner, P.A.

(57) ABSTRACT

A method is provided for controlling measurements in a wireless telecommunications terminal. In a Long Term Evolution (LTE) wireless communication system, the network instructs a UE to measure the received power and quality of the reference signals of the serving cell as well as of neighbor cells. The object of improving the system power consumption of user equipment (UE) that has to perform such measurements is solved by distributing the measurement functionality between RRC and PHY layers such that the RRC layer is enabled to rest in a power save mode unless results of the measurements have to be reported to the network, and to be only active for a minimum to ensure that the UE still behaves standard compliant to the network.

11 Claims, 7 Drawing Sheets

(52) U.S. Cl.
CPC ..... *H04W52/0232* (2013.01); *H04W 52/0241* (2013.01); *H04W 52/0245* (2013.01); *H04W 52/0261* (2013.01); *H04W 52/0264* (2013.01); *H04W 52/0274* (2013.01); *H04W 72/0406* (2013.01); *Y02B 60/50* (2013.01)

(56) References Cited

U.S. PATENT DOCUMENTS

| | | | | |
|---|---|---|---|---|
| 2010/0034096 | A1* | 2/2010 | Yin | H04B 1/707 370/241 |
| 2010/0062764 | A1* | 3/2010 | Aiouaz et al. | 455/434 |
| 2010/0080134 | A1* | 4/2010 | Maniatopoulos et al. | 370/252 |

OTHER PUBLICATIONS

European Search Report for 11169452.7-2414, dated Oct. 31, 2011.
"Considerations on L3 filter scaling when DRX is used", TSG-RAN WG4 Meeting #51, San Francisco, CA, May 4-8, 2009.
"Correction to inconsistency between 25.302 and RRM specifications (25.123_25.133)", TSG-RAN Working Group 2 meeting #29, Gyeongju, Korea May 13-18, 2002.
"Universal Mobile Telecommunications System *UMTS); Services provided by the physical layer (3GPP TS 25.302 version 9.1.0 Release 9)", ETSI TS 125 302, V9.1.0, Sophia Antipolis Cedex France, Apr. 2010.

* cited by examiner

METHOD FOR CONTROLLING MEASUREMENTS IN A WIRELESS TELECOMMUNICATIONS TERMINAL

CROSS REFERENCE TO RELATED APPLICATIONS

This application claims priority of European patent application No. 10165671.8 filed on Jun. 11, 2010, the entire contents of which is hereby incorporated by reference herein.

FIELD OF THE INVENTION

The invention relates to a method for controlling measurement procedures in a telecommunications terminal affiliated to a wireless telecommunications network.

BACKGROUND OF THE INVENTION

3GPP LTE (3rd Generation Partnership Project Long Term Evolution) is the upcoming standard of 4th generation radio access networks. A continuing major challenge for designers is to reduce the system power consumption of mobile terminals, also known as User Equipment (UE) in LTE terminology.

Figure 1:
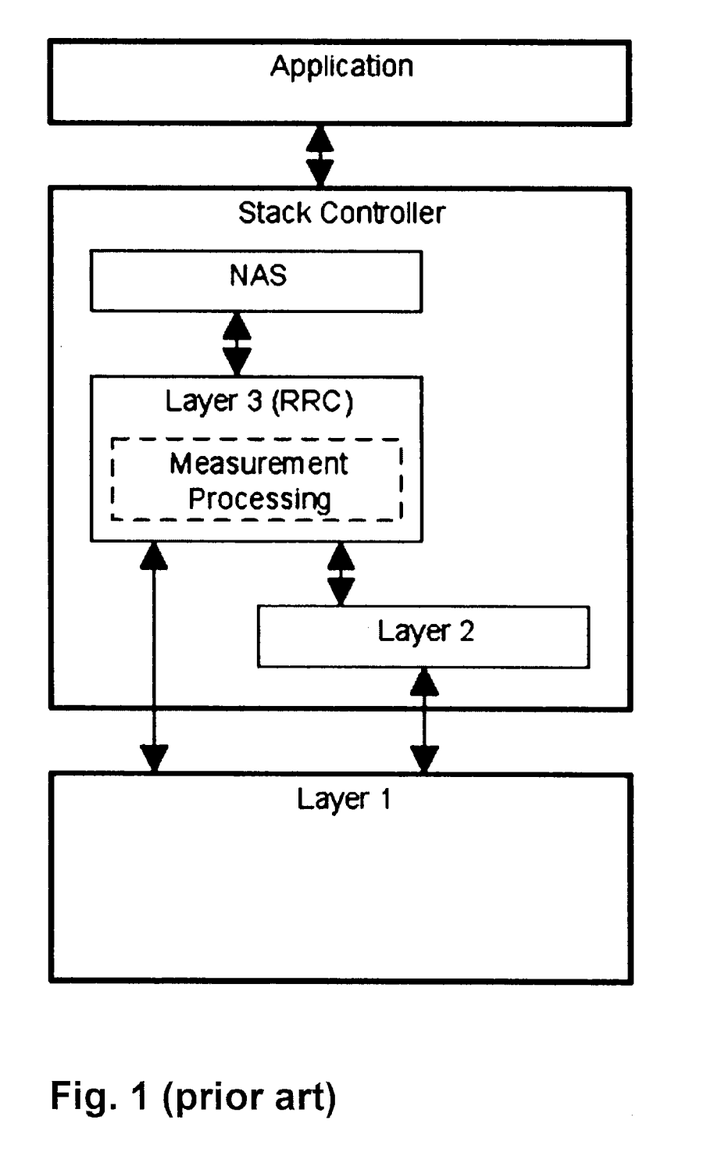
FIG. 1 illustrates the context of measurement processing in user equipment as known from prior art.

FIG. 1 illustrates a protocol stack of a UE according to LTE standard specifications in the terms of the OSI (Open Systems Interconnection) model of logical layers. As is known in the art, the Non-Access Stratum (NAS) layer protocol is responsible for signalling and traffic between UE and the network for control purposes such as network attach, authentication, setting up of bearers, and mobility management. The Radio Resource Control (RRC) protocol of layer 3 is responsible for control plane signalling between a UE and the network, i.e. such tasks as broadcast of system information; establishment, maintenance and release of RRC connection; establishment, configuration, maintenance and release of signalling and data radio bearers; security functions including key management; mobility functions such as control of UE cell selection/reselection; paging; UE measurement configuration, processing and reporting; handover; quality of service (QoS) management functions; UE measurement reporting and control of the reporting, but not exclusively. Layer 3 interfaces with layer 2 and also directly interfaces with layer 1. Layer 2 of the protocol stack comprises a Packet Data Control Protocol (PDCP) sub-layer which is responsible for (de-) compressing the headers of user plane IP packets, a Radio Link Control (RLC) sub-layer which is used to format and transport traffic, and a Medium Access Control (MAC) sub-layer which provides addressing and channel access control mechanisms. Layer 3 interfaces with layer 2 and layer 1. Layer 1, also known as physical (PHY) layer, translates logical communication requests into hardware-specific operations such as modulation, bit synchronization, multiplexing, equalization, forward error correction etc. It has to be noted in this context that the above logical layers are typically reflected in the hardware implementation for a single UE as separate systems-on-a-chip (SoCs) which might even be provided by different vendors.

The LTE standard specifies a measurement procedure for UEs. The network instructs a connected UE to measure the signal power and quality of available base stations. Measurement results have to be reported to the network. The retrieved information is used by the network mainly to decide about the point of time as well as about the target base station of handovers. For each connected UE the network configures the downlink carrier frequencies it has to perform measurements on. Furthermore, the network configures reporting criterions within a UE in order to instruct the UE to only report relevant measurement results. According to protocol standards the measurement procedure of the UE is divided into functional tasks and assigned to different functional layers. Layer 3 filtering and the evaluation of reporting criteria are part of the RRC layer, as specified in LTE standard specifications TS36.331 and illustrated in FIG. 1.

If implemented in the RRC layer as per definition of the standard, some inefficiency with respect to power consumption is system immanent. The main issue is that the PHY reports every measurement result to the Radio Resource Control (RRC) layer. The RRC layer has to process all these results, filter them and check them against several reporting criterions in order to decide if they have to be reported to the network or not. The majority of PHY measurement results do not trigger a report to the network; hence the RRC entity is active although nothing has to be reported to the network.

A general object of the invention is to improve the system power consumption of user equipment (UE) of a wireless communications system. A more particular object of the invention is to improve UE power consumption when performing measurements.

SUMMARY OF THE INVENTION

The invention provides a method for controlling measurement procedures in a telecommunications terminal that is affiliated to a wireless telecommunications network. The terminal receives measurement configuration data from the network at a Radio Resource Control (RRC) layer of said terminal and performs measurements at a physical layer of the terminal. The method of the invention is characterized in that at least a part of the measurement configuration data is communicated from the RRC layer to the physical layer of the terminal. Measurement processing tasks are performed by the physical layer, and the physical layer controls the RRC layer to go into and off a power save mode in function of the results of said measurement processing tasks. The measurement processing tasks performed by the physical layer include at least scheduling of measurements, filtering of measurements, and evaluating measurement reporting criterions. In a preferred embodiment, the RRC layer is kept in a power save mode during time intervals in which the physical layer does not detect any measurement results that have to be reported to the network.

So in contrast to the distribution of processing tasks as proposed by the LTE standard and implemented in well-known RRC solutions for the measurement functionality, the method according to the invention does a reparation of work split between RRC layer and PHY layer of an LTE UE, thus minimizing the awake time for the RRC layer entity.

Preferably, the RRC layer may decide about downlink carrier frequencies and bands of other radio access technologies that are to be measured.

Measurement configuration data may be communicated from the RRC to the PHY layer via a first message that contains RRC information elements which are the same for all carrier frequencies, such as measurement gap configuration, signal strength threshold and measurement quantity configuration, and via a second message that contains RRC information elements specific for each carrier frequency, such as the carrier frequency, a measurement interval, and a configuration of a report to the network. The network report configuration information element may include a scaling factor that depends on the mobility state of the terminal.

In a preferred embodiment, the physical layer directs the RRC layer to go off power save mode when a reporting criterion for a measurement report to the network is fulfilled, using a third message. The physical layer may also inform the RRC layer when a Reference Signal Received Power of the serving cell gets worse than the signal strength threshold, using the third message.

The solution according to the present invention provides a way to optimize power consumption of an LTE UE compared to implementations that follow the standard work split for measurement functionality between RRC and PHY layers where the awake time of the RRC layer entity for performing measurement processing is significantly longer than with the invention.

BRIEF DESCRIPTION OF THE DRAWINGS

Additional features and advantages of the present invention will be apparent from the following detailed description of a preferred embodiment which is given by way of example only and in which reference will be made to the accompanying drawings, wherein.

DETAILED DESCRIPTION

Figure 2:
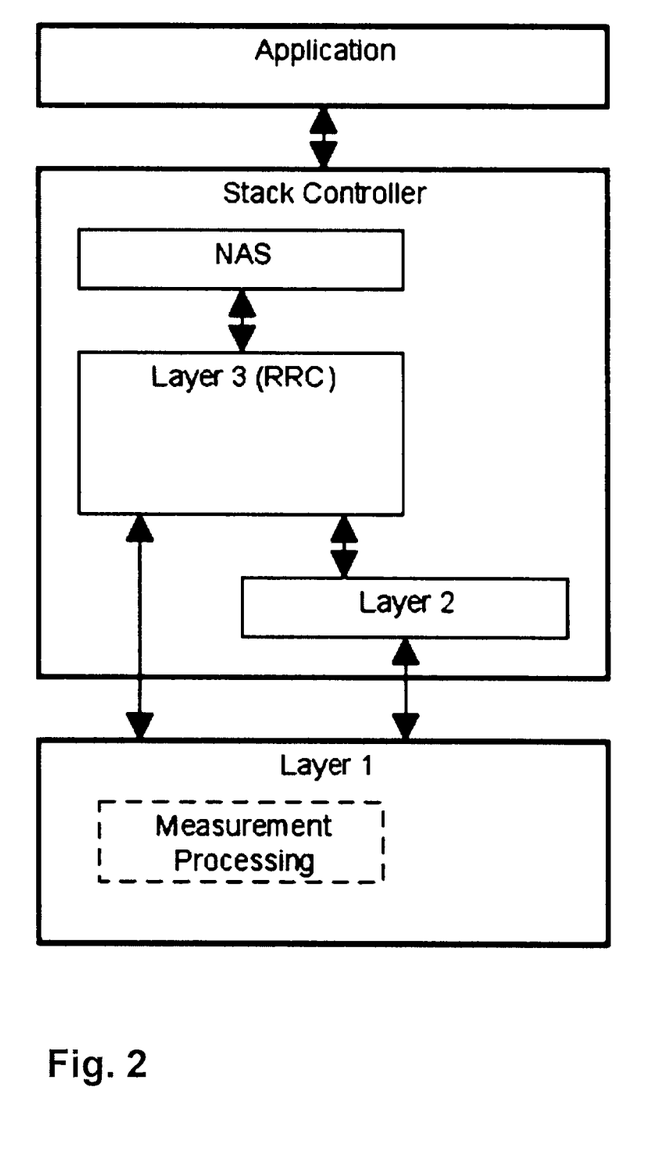
FIG. 2 illustrates the context of measurement processing in user equipment according to the invention.

FIG. 2 illustrates the basic idea of the invention, namely to re-distribute measurement processing tasks within the protocol stack of a UE such that a major part of measurement processing functionality is assign to the PHY layer (layer 1) instead of the RRC layer.

Figure 3:
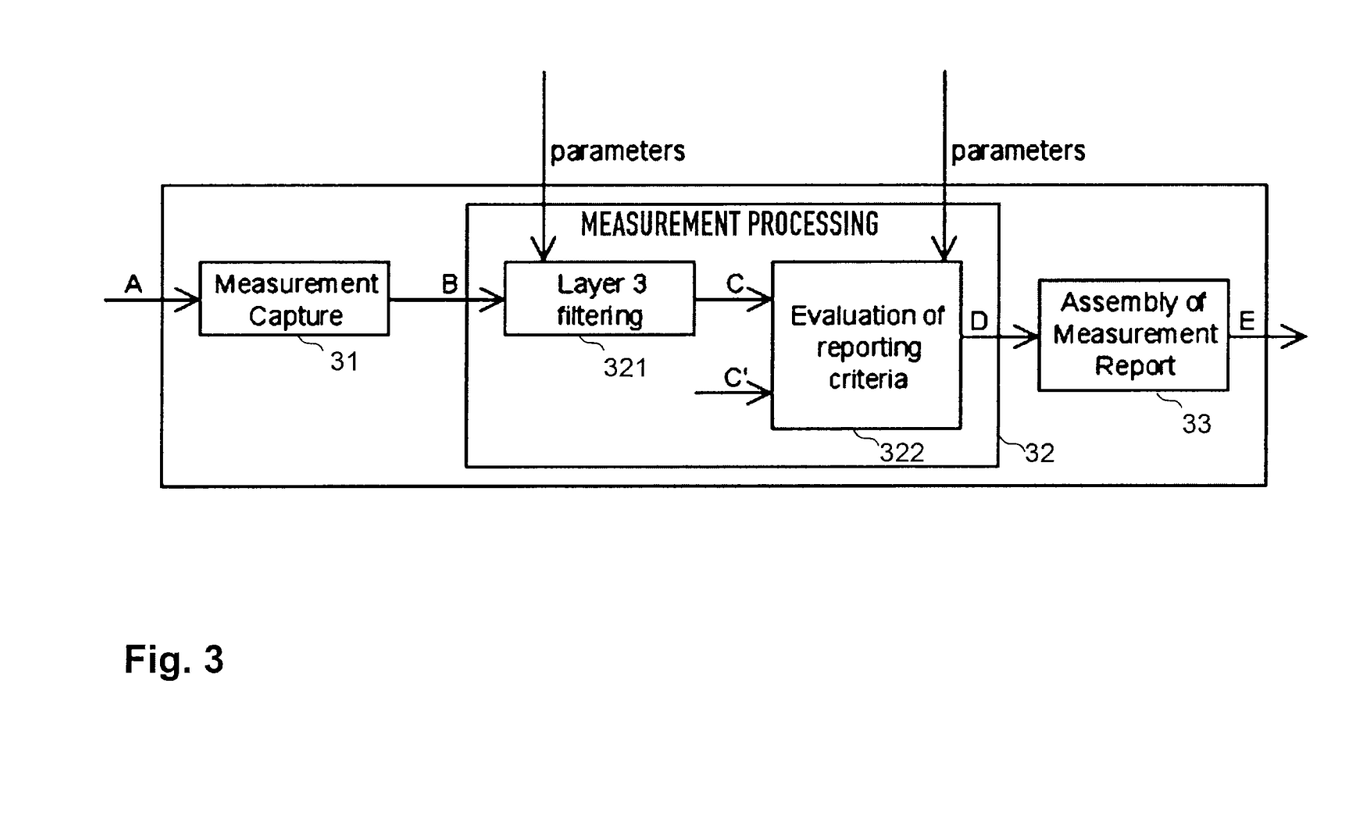
FIG. 3 shows a block diagram of measurement functionality in user equipment.

For a better understanding, FIG. 3 shows a block diagram of measurement functionality in a UE as required by the LTE standard. Arrow A represents the input of measurements sampled on the radio, i.e. air, interface. The measurements are captured at the physical layer (PHY) where they are subjected to some processing such as averaging, determination of signal power and quality. Arrow B represents the measurement results following PHY processing that are input to a measurement processing block 32 which consists of 'Layer 3 filtering' functionality at 321 and evaluation of reporting criteria functionality at 322. The functionality of blocks 321 and 322 is configured by respective parameters that are input to the processing entity, as shown in FIG. 3. Arrow C represents the measurement results following standardized layer 3 filtering. Every measurement result 'B' leads to one measurement result 'C'. The measurement results have to be reported to the network. According to the standard specifications, every measurement result 'C' entrains evaluation of the reporting criteria, at 321. Arrow C' represents target values or older measurement results that might have to be taken into account, e.g. values of the servicing cell. Arrow D represents the measurement results that will be reported to the network. Measurement results D are only sent if at least one reporting criterion is fulfilled.

In contrast to the allocation of processing tasks as specified by LTE standard and implemented in well-known RRC SoC solutions wherein the measurement functionality of block 32 is performed by the RCC layer, the invention proposes to allocate the tasks of measurement processing block 32 to be performed by the PHY layer of an LTE UE. Thus, the interface between PHY and RRC layers has to handle measurement results "D" (following evaluation of reporting criteria) instead of measurement results "B" (following Measurement Capture).

Since results D are only transferred if a reporting criterion is fulfilled, the re-distribution of measurement tasks according to the invention provides the possibility for the RRC to rest in a power save mode during time intervals in which the measurements yield results that do not have to be reported to the network which directly translates into a longer battery life at the UE.

Finally, arrow E represents the measurement report that is sent to the network on the radio interface. For this report, measurement results 'D' are formatted into a standardized RRC measurement report message.

Figure 4:
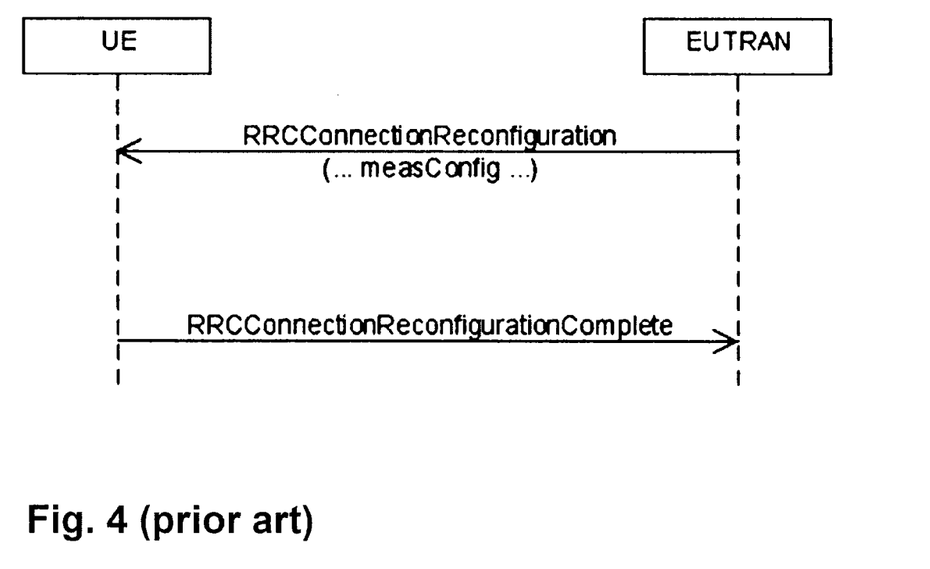
FIG. 4 shows the message sequence of a measurement configuration process between network and user equipment.

The measurement functionality of a UE is generally configured by the network, also known as Evolved UMTS Terrestrial Radio Access Network, EUTRAN, in LTE terminology. Configuration is performed via an RRC connection reconfiguration message exchange, as shown in FIG. 4. As a result of this configuration the following measurement behavior is regulated:

downlink carrier frequencies on which measurements are to be performed filtering parameters quantity parameters for every downlink carrier frequency: reporting configuration.

Conventionally, this configuration is performed at the RRC layer.

Figure 5:
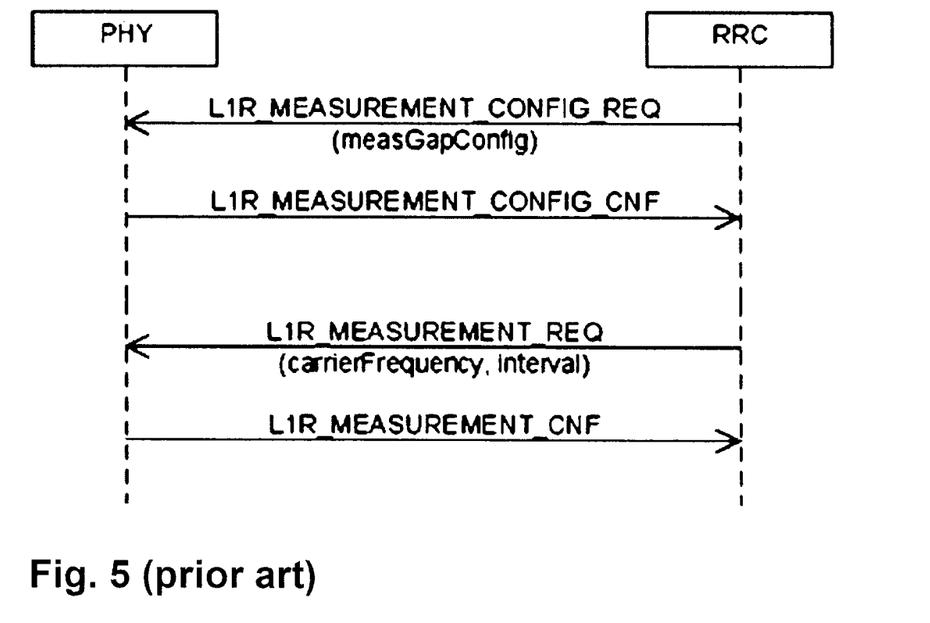
FIG. 5 shows the configuration process within a UE according as known from prior art.
Figure 6:
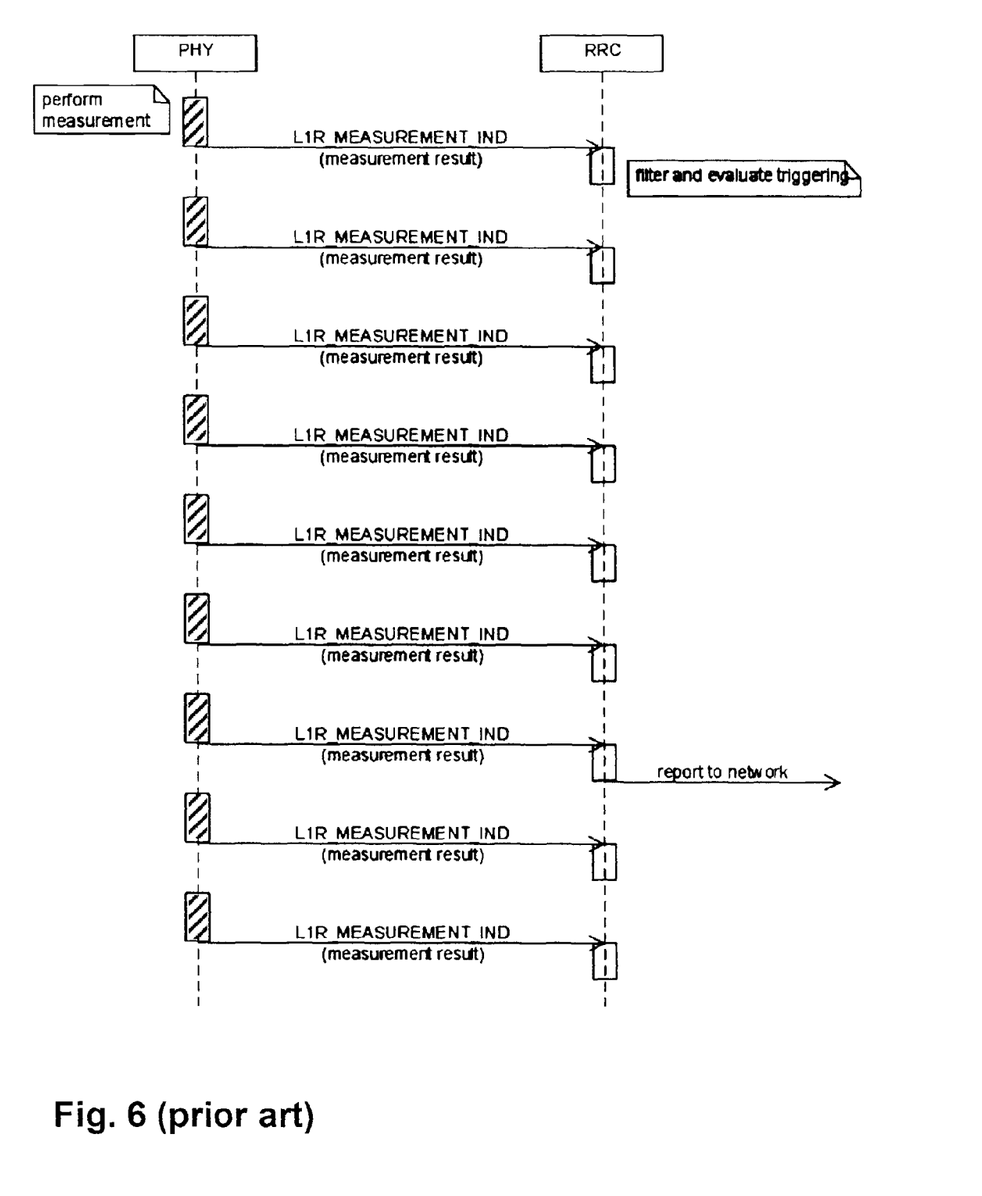
FIG. 6 shows an exemplary measurement reporting sequence according to prior art.

FIG. 5 shows the message sequence that is used for general measurement configuration, i.e. to configure or reconfigure carrier frequency independent measurement parameters, and for measurement settings for each single downlink carrier frequency. In order to retrieve measurement results from the PHY layer, the RRC layer configures the PHY layer to periodically perform measurements on certain downlink carrier frequencies. The RRC layer configures carrier frequency independent measurement settings such as the configuration of measurement gaps ('measGapConfig') using L1R_MEASUREMENT_CONFIG_REQ and L1R_MEASUREMENT_CONFIG_CNF messages. The periodicity of measurements ('interval') is configured by the RRC per carrier frequency ('carrierFrequency'), using L1R_MEASUREMENT_REQ and L1R_MEASUREMENT_CNF messages. FIG. 6 shows an exemplary measurement reporting sequence according to the prior art. If the partitioning of measurement functionality is done as specified by LTE standard, the RRC layer has to process every measurement result taken by the PHY layer. The RRC layer has to apply filtering and to evaluate if a measurement report criteria is fulfilled so that it has to issue a measurement report to the network. The L1R_MEASUREMENT_IND message shown in FIG. 6 includes measurement results as represented by arrow B in FIG. 3.

However, the majority of measurement results from the PHY layer will not entail a measurement report to the network; hence the RRC entity is active although nothing has to be reported to the network.

Figure 7:
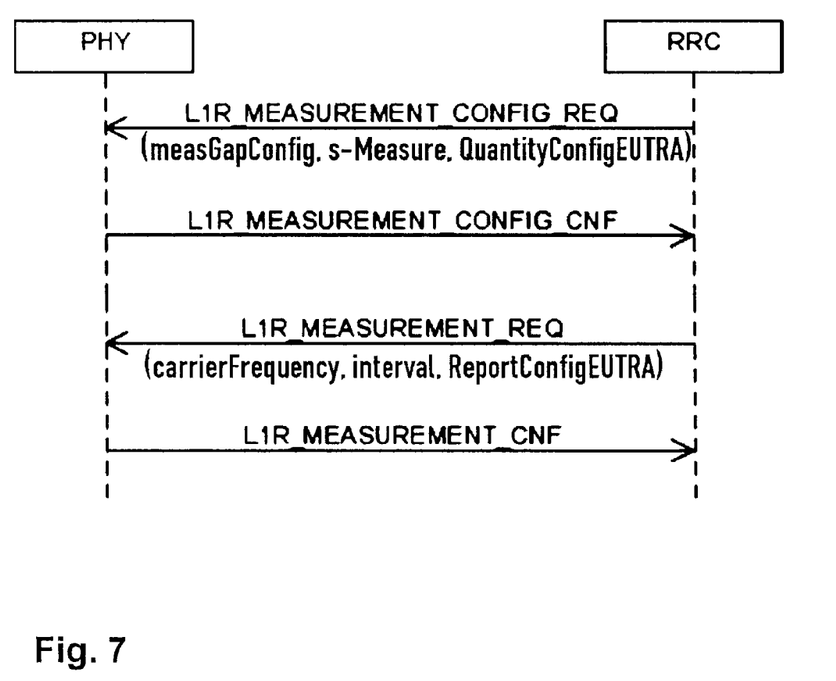
FIG. 7 shows the measurement configuration process within a UE according to the invention.

FIG. 7 shows the measurement configuration process within a UE as suggested by the invention. The RRC layer of a UE that has implemented measurement functionality according to the invention will not perform layer 3 filtering and evaluation of report triggering as illustrated by block 32 in FIG. 3, but will instead provide all relevant parameters to the PHY layer so that the PHY layer is able to control this functionality. The relevant parameters are part of the RRC information elements:
QuantityConfigEUTRA
s-Measure
ReportConfigEUTRA Furthermore, the PHY layer has to be aware of the speed dependent scaling factor as this has to be applied to the standard TimeToTrigger parameter which is part of the ReportConfigEUTRA information element. Since only the RRC layer is aware of the mobility state of the UE as well as the scaling factors that have to be applied in function of the mobility state, the RRC layer has to provide a TimeToTrigger value to the PHY with the speed dependent scaling factor already applied.

As shown in FIG. 7, the RRC layer provides configuration that is relevant for the overall measurement functionality (i.e. independent of carrier frequency) using a L1R_MEASUREMENT_CONFIG_REQ message. To enable the PHY layer to perform so called 'layer 3 filtering' (though it is not performed in layer 3 according to the invention), RRC has to provide the QuantityConfigEUTRA. An s-Measure value is needed within the PHY as an additional reporting criterion as described below. Configuration that might differ per carrier frequency is provided using a L1R_MEASUREMENT_REQ message. In order to evaluate whether a measurement result has to trigger a report, the PHY layer needs to be aware of the content of the information element ReportConfigEUTRA. So as shown in FIG. 7, the L1R_MEASUREMENT_REQ message indicates the carrier frequency and the measurement interval parameters, like in prior art, and additionally includes the ReportConfigEUTRA information element.

Figure 8:
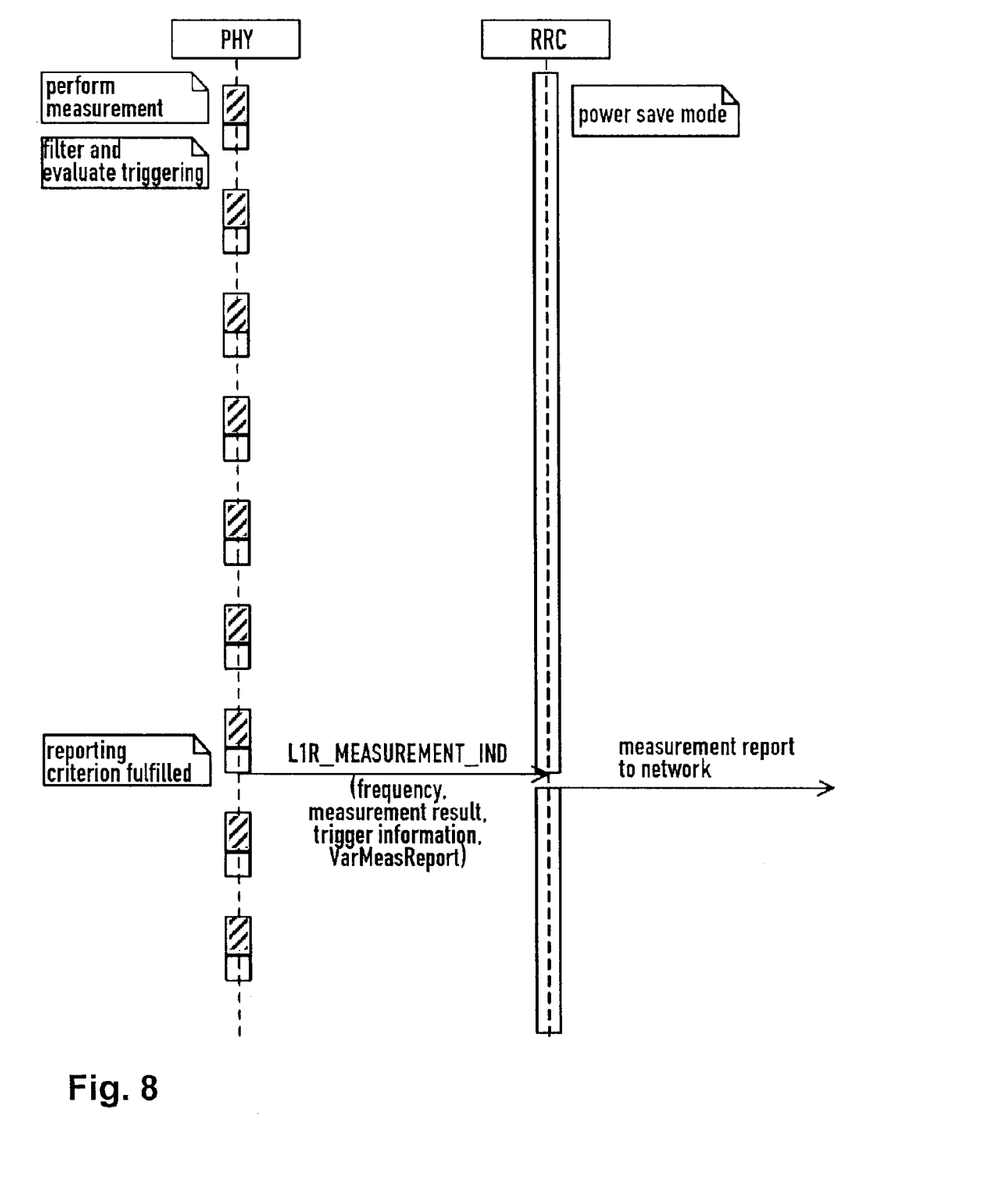
FIG. 8 shows an exemplary measurement reporting sequence according to the invention.

FIG. 8 shows an exemplary measurement reporting sequence according to the invention. The PHY layer will perform measurements for each carrier frequency configured by an L1R_MEASUREMENT_REQ message taking into account the interval parameter. If ReportConfigEUTRA parameters are set for a carrier frequency, PHY will process layer 3 filtering and measurement report triggering evaluation in similar manner as specified in the standard for the RRC procedure. The PHY layer will maintain a copy of VarMeasReport in order to achieve this. VarMeasReport is a variable holding information about measurements for which trigger conditions have been met. This variable is part of the RRC specification (TS 136 331 V9.0.0). Only if a measurement report has to be triggered, the PHY layer will send the relevant information to the RRC layer, using a L1R_MEASUREMENT_IND message that includes an indication of the reason of the report ('triggerInformation').

It stays within the responsibility of the RRC to decide what downlink carrier frequencies and also what bands of other radio access technologies have to be measured. This decision can be based on the Reference Signal Received Power (RSRP) of the serving cell. The RRC might decide to measure on certain frequencies only if the RSRP of the serving cell gets worse than the threshold indicated by the parameter s-Measure. The PHY layer provides the possibility to monitor the s-Measure criterion on the serving cell. Therefore, the RRC layer can configure the s-Measure parameter using the L1R_MEASUREMENT_CONFIG_REQ message. If this parameter is set, the PHY layer will inform the RRC layer once the serving cell RSRP gets worse than the s-Measure threshold using a L1R_MEASUREMENT_IND message including an indication that the s-Measure criteria was fulfilled.

It has thus been disclosed a method for improving the system power consumption of user equipment that has to perform measurement tasks by distributing the measurement functionality between RRC and PHY layers such that the RRC layer is enabled to rest in a power save mode unless results of the measurements have to be reported to the network, and to be only active for a minimum to ensure that the UE still behaves standard compliant to the network. Modifications and combinations of the disclosed method features will be apparent to those skilled in the art and come within the scope of the invention as defined by the appended claims.

The invention claimed is:

1. A method for controlling measurement procedures in a telecommunications terminal affiliated to a wireless telecommunications network, the method comprising:
   receiving measurement configuration data, including measurement reporting criteria, from the wireless telecommunications network at a Radio Resource Control (RRC) layer of said telecommunications terminal;
   communicating the measurement configuration data and the measurement reporting criteria from said RRC layer to a physical layer of the telecommunications terminal;
   performing a measurement given by the measurement configuration data at the physical layer of the terminal;
   evaluating results of the measurement with the measurement reporting criteria at the physical layer of the telecommunications terminal to provide evaluation results;
   controlling said RRC layer from the physical layer to go into or remain in a power save mode if the evaluation results do not trigger a measurement result report to the wireless telecommunications network;
   controlling said RRC layer from the physical layer to exit the power save mode to report the measurement if the evaluation results of the measurement trigger the measurement result report to the wireless telecommunications network; and
   wherein the performing a measurement given by the measurement configuration data at the physical layer of the terminal includes performing layer 3 filtering at the physical layer.

2. The method of claim 1, comprising: scheduling the measurement and filtering the measurement.

3. The method of claim 1, further comprising deciding about downlink carrier frequencies and bands of other radio access technologies that are to be measured, by the RRC layer.

4. The method of claim 1, wherein the communicating at least a part of said measurement configuration data from said RRC layer to said physical layer comprises communicating a first message that contains RRC information elements which are the same for all carrier frequencies, and communicating a second message that contains RRC information elements specific for each carrier frequency.

5. The method of claim 4, wherein said RRC information elements included in the first message define at least a measurement gap configuration, a signal strength threshold for a serving cell, and a measurement quantity configuration for performing the layer 3 filtering.

6. The method of claim 4, wherein said RRC information elements included in the second message define at least a carrier frequency, a measurement interval, and a configuration of a report to the wireless telecommunications network.

7. The method of claim 6, wherein said wireless telecommunications network report configuration information element includes a scaling factor that depends on a mobility state of the telecommunications terminal.

8. The method of claim 4, wherein the physical layer uses a third message to direct the RRC layer to go off the power save mode when a reporting criterion of the measurement reporting is fulfilled.

9. The method of claim 8, wherein the physical layer informs the RRC layer when a Reference Signal Received Power (RSRP) of a serving cell gets worse than a signal strength threshold using said third message.

10. A method for controlling measurement procedures in a telecommunications terminal affiliated to a wireless telecommunications network, the method comprising:
   receiving measurement configuration data, including measurement reporting criteria, from the wireless telecommunications network at a Radio Resource Control (RRC) layer of said telecommunications terminal;
   communicating the measurement configuration data and the measurement reporting criteria from said RRC layer to a physical layer of the telecommunications terminal;
   performing a measurement given by the measurement configuration data at the physical layer of the terminal;
   evaluating results of the measurement with the measurement reporting criteria at the physical layer of the telecommunications terminal to provide evaluation results;
   controlling said RRC layer from the physical layer to go into or remain in a power save mode if the evaluation results do not trigger a measurement result report to the wireless telecommunications network;
   controlling said RRC layer from the physical layer to exit the power save mode to report the measurement if the evaluation results of the measurement trigger the measurement result report to the wireless telecommunications network;
   wherein the communicating at least a part of said measurement configuration data from said RRC layer to said physical layer comprises communicating a first message that contains RRC information elements which are the same for all carrier frequencies, and communicating a second message that contains RRC information elements specific for each carrier frequency; and
   wherein said RRC information elements included in the first message define at least a measurement gap configuration, a signal strength threshold for a serving cell, and a measurement quantity configuration for performing layer 3 filtering.

11. A method for controlling measurement procedures in a telecommunications terminal affiliated to a wireless telecommunications network, the method comprising:
   receiving measurement configuration data, including measurement reporting criteria, from the wireless telecommunications network at a Radio Resource Control (RRC) layer of said telecommunications terminal;
   communicating the measurement configuration data and the measurement reporting criteria from said RRC layer to a physical layer of the telecommunications terminal;
   performing a measurement given by the measurement configuration data at the physical layer of the terminal;
   evaluating results of the measurement with the measurement reporting criteria at the physical layer of the telecommunications terminal to provide evaluation results;
   controlling said RRC layer from the physical layer to go into or remain in a power save mode if the evaluation results do not trigger a measurement result report to the wireless telecommunications network;
   controlling said RRC layer from the physical layer to exit the power save mode to report the measurement if the evaluation results of the measurement trigger the measurement result report to the wireless telecommunications network;
   wherein the communicating at least a part of said measurement configuration data from said RRC layer to said physical layer comprises communicating a first message that contains RRC information elements which are the same for all carrier frequencies, and communicating a second message that contains RRC information elements specific for each carrier frequency;
   wherein the physical layer uses a third message to direct the RRC layer to go off the power save mode when a reporting criterion of the measurement reporting criteria is fulfilled; and
   wherein the physical layer informs the RRC layer when a Reference Signal Received Power (RSRP) of a serving cell gets worse than a signal strength threshold using said third message.

* * * * *

UNITED STATES PATENT AND TRADEMARK OFFICE
CERTIFICATE OF CORRECTION

PATENT NO. : 9,439,206 B2
APPLICATION NO. : 13/158770
DATED : September 6, 2016
INVENTOR(S) : Hofmann et al.

Page 1 of 1

It is certified that error appears in the above-identified patent and that said Letters Patent is hereby corrected as shown below:

On the Title Page

In item (30), in "Foreign Application Priority Data", in Column 1, Line 1, delete "10165671" and insert --10165671.8--, therefor Signed and Sealed this
Eleventh Day of June, 2019

Andrei Iancu
*Director of the United States Patent and Trademark Office*